US009710861B2

(12) United States Patent
Wohlert et al.

(10) Patent No.: US 9,710,861 B2
(45) Date of Patent: Jul. 18, 2017

(54) OPTIMIZING SOCIAL INFORMATION SIGNALING

(71) Applicant: AT&T Intellectual Property I, L.P., Atlanta, GA (US)

(72) Inventors: Randolph Wohlert, Austin, TX (US); Samir Bhatt, Bothell, WA (US); James H Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 659 days.

(21) Appl. No.: 13/652,316

(22) Filed: Oct. 15, 2012

(65) Prior Publication Data

US 2014/0108525 A1 Apr. 17, 2014

(51) Int. Cl.
*G06F 15/16* (2006.01)
*G06Q 50/00* (2012.01)

(52) U.S. Cl.
CPC .................................... *G06Q 50/01* (2013.01)

(58) Field of Classification Search
CPC ...................................................... G06Q 50/01
See application file for complete search history.

(56) References Cited

U.S. PATENT DOCUMENTS 5,237,428 A * 8/1993 Tajitsu ............... H04N 1/32037 358/437
2008/0040474 A1* 2/2008 Zuckerberg et al. ......... 709/224
2010/0287256 A1* 11/2010 Neilio ........................... 709/217
2012/0082158 A1* 4/2012 Reddy et al. ................. 370/389
2012/0310823 A1* 12/2012 McNab .................. G06Q 20/10 705/39
2013/0091223 A1* 4/2013 DeLuca ................. G06Q 10/10 709/206

OTHER PUBLICATIONS

Zeller (Zeller, Lukas, SyncML LITE for iOS, Jul. 19, 2011, iTunesPreview, Apple, pp. 1-2, retrieved on Apr. 28, 2015 from https://itunes.apple.com/us/app/syncml-lite-for-ios/id284950142?mt=8).*

Facebookchat (Facebookchat, Apr. 6, 2008, Facebook Chat Launches—Tour & First Impressions, by admin, retrieved from http://www.adweek.com/socialtimes/facebook-chat-launches-tour-first-impressions/211794?red=if, on Aug. 11, 2015).*

* cited by examiner

*Primary Examiner* — Tauqir Hussain
*Assistant Examiner* — Michael A Keller

(57) ABSTRACT

A method and apparatus for optimizing social information signaling in a communication network are disclosed. For example, the method receives an indication that social information associated with a first endpoint device has changed, determines whether the social information is to be forwarded to a second endpoint device in a list of the first endpoint device based upon a behavior parameter, wherein the behavior parameter comprises a strength of relationship, and forwards the social information to the second endpoint device if the behavior parameter is above a pre-defined level.

13 Claims, 5 Drawing Sheets

OPTIMIZING SOCIAL INFORMATION SIGNALING

The present disclosure relates generally to reducing signaling in a communication network and, more particularly, to a method and apparatus for optimizing social information signaling.

BACKGROUND

The way people communicate over a communication network is changing. For example, over the top (OTT) service providers are providing free services that utilize a communication network service provider's bandwidth. Many of the services offered by the OTT service providers require a large amount of signaling back and forth between two endpoints and the communication network service provider's network. This additional signaling can overload the communication network service provider's network and, sometimes, even completely shut down the communication network service provider's network. This can create a loss of revenue to the communication network service provider and a dissatisfying customer experience for the communication network service provider's customers.

SUMMARY

In one embodiment, the present disclosure provides a method for optimizing social information signaling in a communication network. For example, the method receives an indication that social information associated with a first endpoint device has changed, determines whether the social information is to be forwarded to a second endpoint device in a list of the first endpoint device based upon a behavior parameter, wherein the behavior parameter comprises a strength of relationship, and forwards the social information to the second endpoint device if the behavior parameter is above a pre-defined level.

The present disclosure provides a second embodiment of a method for optimizing social information signaling in a communication network. For example, the method receives a social information query of a second endpoint device from a first endpoint device, queries a server having social information associated with second endpoint device to determine if the social information of the second endpoint device is available, and forwards the social information to the first endpoint device in response to the social information query if the social information of the second endpoint device is available in the network address book associated with the second endpoint device.

The present disclosure provides a third embodiment of a method for optimizing social information signaling in a communication network. For example, the method synchs social information associated with a first endpoint stored on the network address book with a presence server, receives at the network address book an indication that social information associated with a first endpoint device has changed, and forwards, via the network address book, the indication that the social information associated with the first endpoint device has changed to a second endpoint device of a user that is associated with the first endpoint device.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory (i.e., tangible or physical) computer readable medium and apparatus for optimizing social information signaling in a communications network. As noted above, many of the services offered by the OTT service providers require a large amount of signaling back and forth between two endpoints and the communication network service provider's network.

For example, social networking services may leverage status information of users. In addition the social network services may be used by a variety of endpoint devices, including mobile endpoint devices. The status information has become the new "dial tone" for endpoint devices. However, maintaining the status information of user's endpoint devices requires a large amount of signaling and "chatter" across the communication network service provider's network.

This additional signaling can overload the communication network service provider's network and, sometimes, even completely shut down the communication network service provider's network. This can create a loss of revenue to the communication network service provider and a dissatisfying customer experience for the communication network service provider's customers.

One embodiment of the present disclosure provides methods for optimizing social information signaling in a communication network. For example, minimizing the amount of signaling messages that are sent across the communication network to obtain social information would increase the available bandwidth in the communication network, reduce costs and generate more revenue for the communication network service provider.

Figure 1:
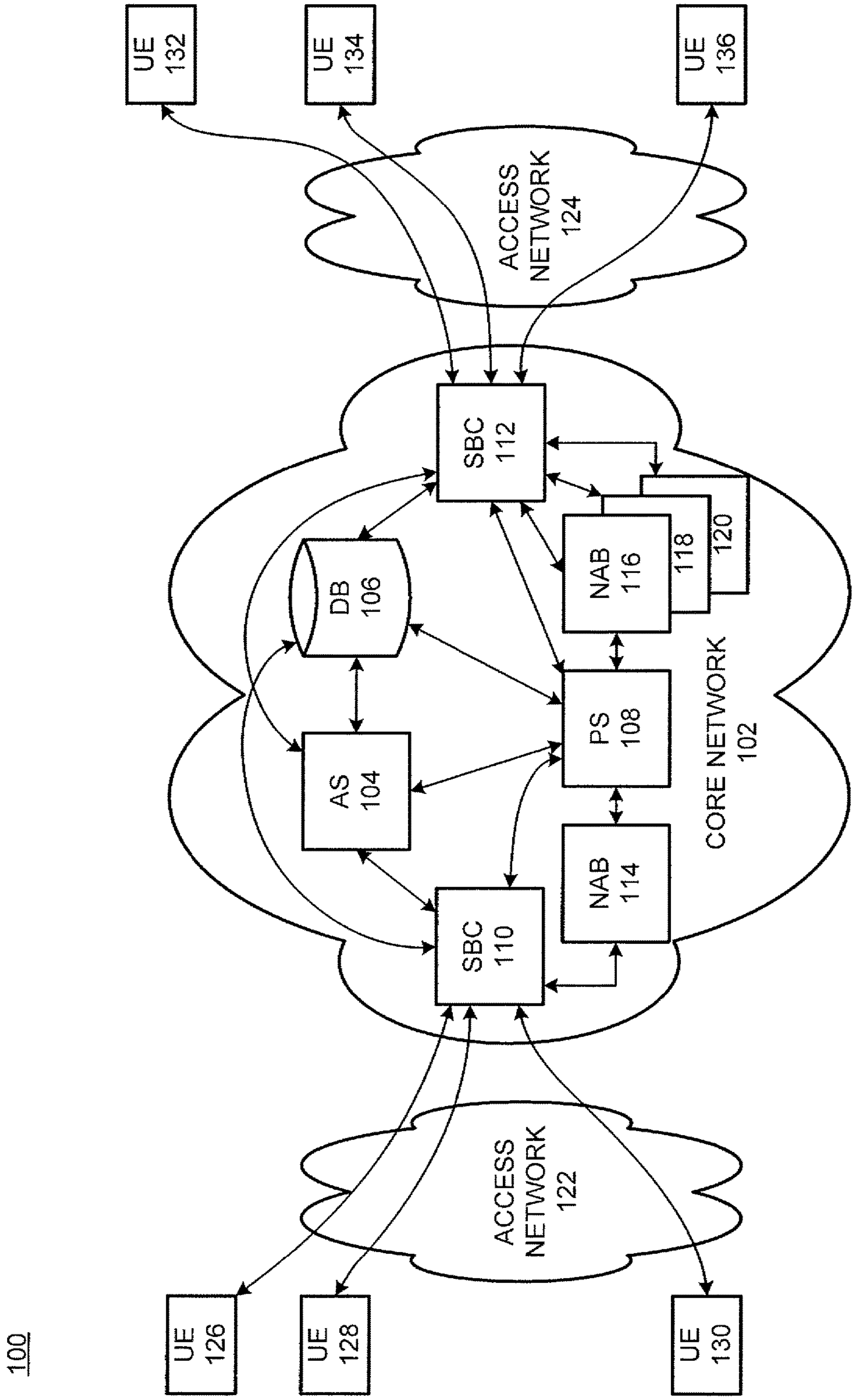
FIG. 1 illustrates one example of a communication network of the present disclosure.

FIG. 1 is a block diagram depicting one example of a communication network 100. The communication network 100 may be any type of communication network, such as for example, a traditional circuit switched network (e.g., a public switched telephone network (PSTN)) or a packet network such as an Internet Protocol (IP) network (e.g., an IP Multimedia Subsystem (IMS) network, an asynchronous transfer mode (ATM) network, a wireless network, a cellular network (e.g., 2G, 3G, and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 122 and 124. The access networks 122 and 124 may include a wireless access network (e.g., a WiFi network and the like), a cellular access network, a PSTN access network, a cable access network, a wired access network and the like. In one embodiment, the access networks 122 and 124 may all be different types of access networks, may all be the same type of access network, or some access networks may be the same type of access network and other may be different types of access networks. The core network 102 and the access networks 122 and 124 may be operated by different service providers, the same service provider or a combination thereof.

In one embodiment, the core network 102 may include an application server (AS) 104, a database (DB) 106, a presence server (PS) 108, one or more session border controllers (SBC) 110 and 112 and one or more network address books (NABs) 114, 116, 118 and 120. Although only a single AS 104, a single DB 106 and a single PS 108 are illustrated, it should be noted that any number of application servers 104, databases 106 or presence servers 108 may be deployed. Although the AS 104, the DB 106 and the PS 108 are illustrated as different devices, it should be noted that the functions of the AS 104, the DB 106 and the PS 108 may be combined into a single device or server. In addition, although two SBCs 110 and 112 are illustrated and four NABs 114, 116, 118 and 120 are illustrated any number of SBCs and NABs may also be deployed.

Figure 5:
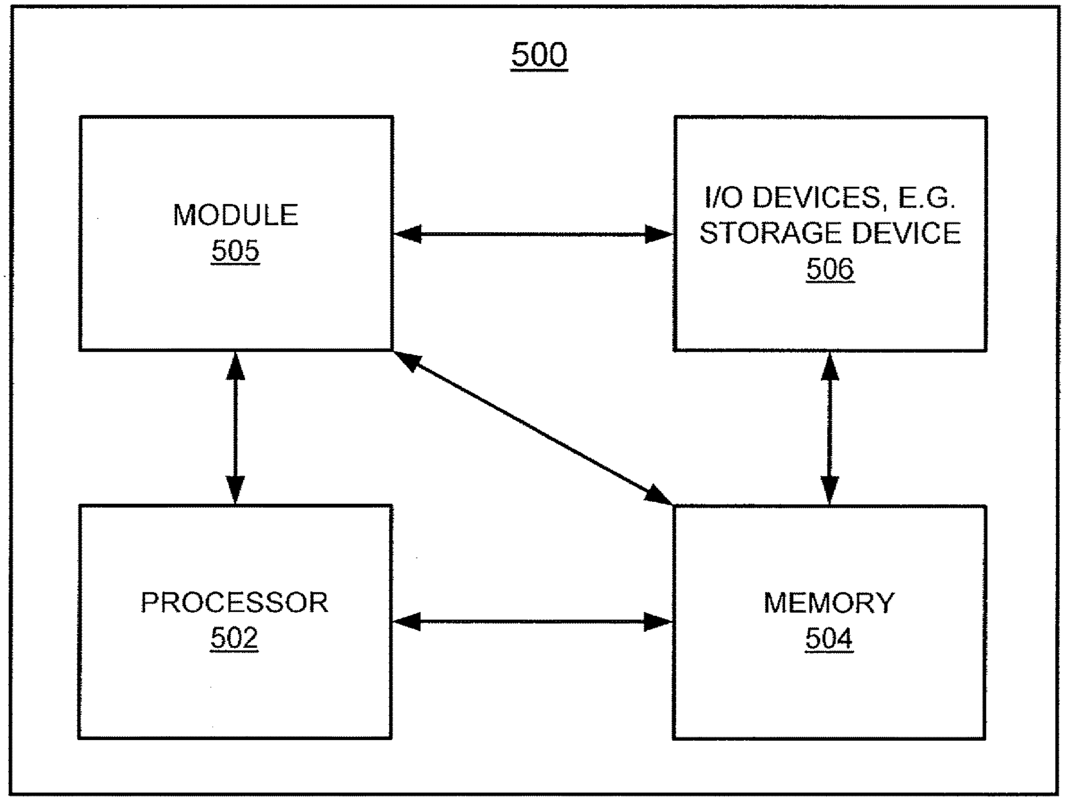
FIG. 5 illustrates a high-level block diagram of a general-purpose computer suitable for use in performing the functions described herein.

In one embodiment, the AS 104 may comprise a general purpose computer as illustrated in FIG. 5 and discussed below. In one embodiment, the AS 104 may perform various functions in the core network 102 such as for example, data compression, smart signaling aggregation, and the like.

In one embodiment, the DB 106 may store information used for user behavior based signaling optimization discussed in further detail below. The information may include, for example, various parameters that may be user defined or automatically determined by intelligence in the core network 102 (e.g., the AS 104). A few examples of the parameters may include data that is determined to be critical or non-critical, an importance level of a relationship with other users, a frequency of use of other devices, and the like. In another embodiment, the parameters may be dynamic. For example, the strength of a relationship with other users may be initially set based upon monitoring a level of communication with a particular endpoint device and may change as the level of communication increases or decreases over a pre-defined time period.

In one embodiment, the PS 108 may store various information and be responsible for transmitting various social information to one or more endpoints. For example, the PS 108 may be used to store a friends list (broadly referred to as a list) for a user, provide various social information services (e.g., status updates), store device capabilities of each endpoint device, and the like. In one embodiment, social information may include, for example, a status, a location, an avatar, a profile picture, a mood, and the like.

In one embodiment, one or more subscribers may be subscribed to an NAB. For example, the user associated with a user endpoint (UE) 126 may be associated with the NAB 114, the user associated with a UE 132 may be associated with the NAB 116, the user associated with a UE 134 may be associated with the NAB 118 and the user associated with a UE 136 may be associated with the NAB 120. It should be noted that all subscribers do not necessarily need to be subscribed to an NAB. The NABs 114, 116, 118 and 120 use a specialized signaling protocol known as synchronization markup language (SynchML). SynchML does not support signaling of social information between devices of different users, but may still be leveraged in the communication network 100 to optimize social information signaling and be interworked with the PS 108 and other device client peer to peer (P2P) approaches.

In one embodiment, the access network 122 may be in communication with one or more UEs 126, 128 and 130. In one embodiment, one or more UEs 126, 128 and 130 may each be associated with a same user and the NAB 114. The one or more UEs 126, 128 and 130 may be any type of UE including for example, a mobile telephone, a smart telephone, a tablet computer, a netbook computer, a laptop computer, a desktop computer, and the like.

In one embodiment, the access network 124 may be in communication with one or more UEs 132, 134 and 136. In one embodiment, the UEs 132, 134 and 136 may each be different users. In one embodiment, the UEs 132, 134 and 136 may be on a friends list associated with the UE 126. Each one of the UEs 132, 134 and 136 may have a different strength of relationship with the UE 126.

It should be noted that the communication network 100 has been simplified. For example, the network 100 may include other network elements (not shown) such as border elements, routers, switches, policy servers, security devices, gateways, a content distribution network (CDN) and the like.

In one embodiment, the example communication network 100 may be used to exchange social information between UEs 126, 128, 130, 132, 134 and 136. One example of social information signaling may be when a status of the UE 126 changes. As noted above, the status of the UE 126 is the new "dial tone". The status may indicate, for example, whether the user of the UE 126 is online, offline, active, inactive, busy, available, and the like.

Currently, social information, such as a status update, may be sent in a push or pull model. In the push model, when the status of the UE 126 changes, a session initiation protocol (SIP) publish message may be sent across the access network 122 to the PS 108 in the core network 102. The PS 108 may then send a SIP notify message to each friend on the friends list of the UE 126. For example, if the UEs 132, 134 and 136 were each on the friends list of the UE 126, three SIP notify messages would be sent from the PS 108 across the access network 124 to the UEs 132, 134 and 136.

In the pull model, each one of the UEs 132, 134 and 136 may send a SIP options message across the access network 124 through the core network 102 across the access network 122 to the UE 126 requesting a status of the UE 126. In response, the UE 126 would send a response using the SIP options message back across the access network 122, through the core network 102 and across the access network 124 to the UEs 132, 134 and 136.

Notably, the push and pull models are typically performed periodically and can lead to a large number of signaling messages being sent across the access networks 122 and 124 and the core network 102. As noted above, this can consume much of the resources and bandwidth available in the communication network 100 leading to possible network crashes and poor customer experiences.

Figure 2:
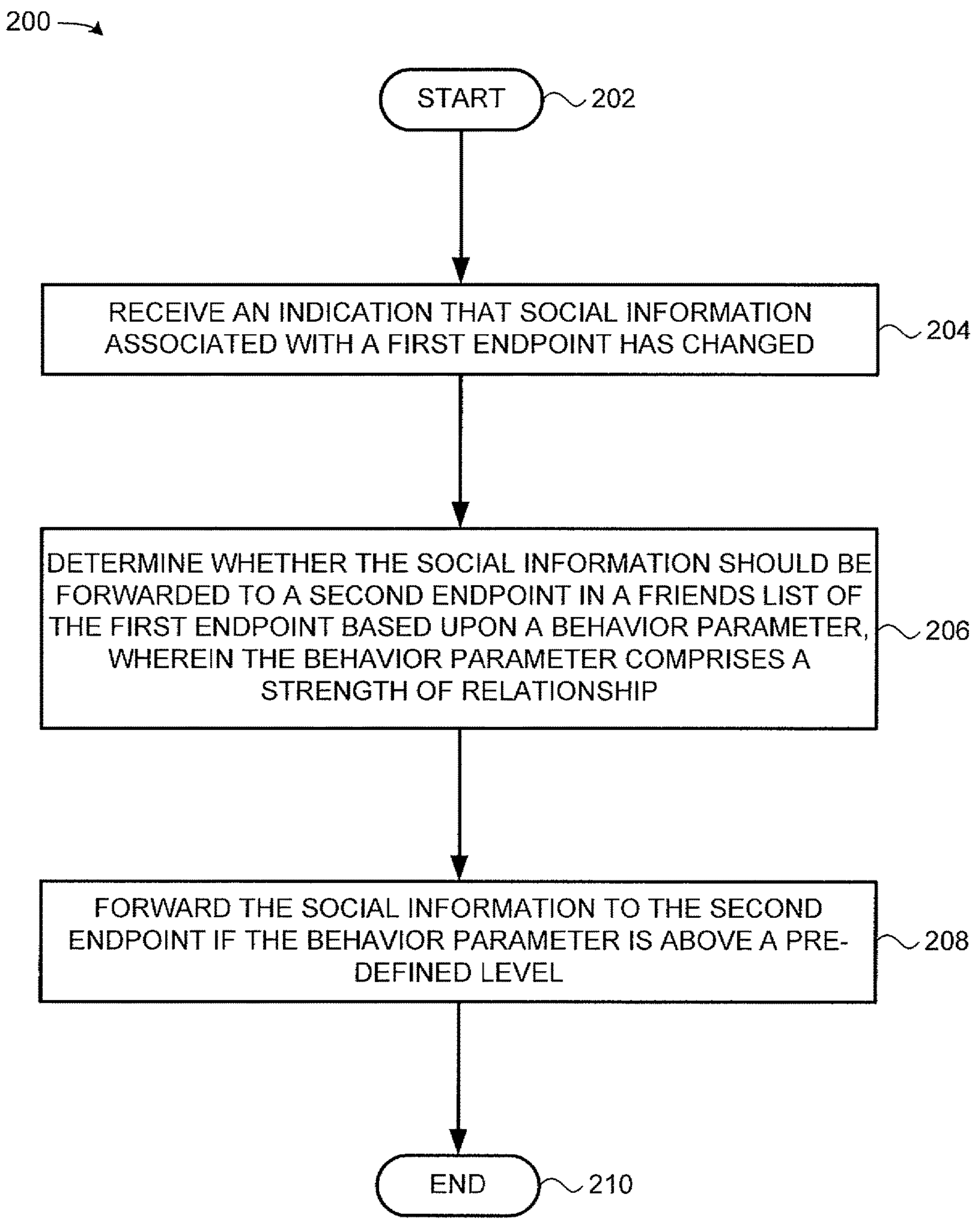
FIG. 2 illustrates an example flowchart of one embodiment of a method for optimizing social information signaling in a communication network.

In one embodiment, the social information signaling can be optimized to reduce the overall number of signaling messages sent across the communication network 100 by using a behavior model. One example of a method for optimizing social information signaling in a communication network is described in FIG. 2. FIG. 2 illustrates an example flowchart of one embodiment of a method 200 for optimizing social information signaling in a communication network. In one embodiment, the method 200 may be performed by the PS 108 in the core network 102. In one embodiment, the steps, functions, or operations of method 200 may be performed by a computing device 500 as described in connection with FIG. 5.

The method 200 begins at step 202. At step 204, the method 200 receives an indication that social information associated with a first endpoint has changed. In one embodiment, the social information may be a status of an endpoint. For example, the status of UE 126 may change from offline to online. As a result, the PS 108 may receive a SIP publish message from the UE 126 indicating that the status of UE 126 has changed from offline to online.

At step 206, the method 200 determines whether the social information should be forwarded to a second endpoint in a friends list of the first endpoint based upon a behavior parameter, wherein the behavior parameter comprises a strength of relationship. In one embodiment, the method 200 may determine whether the social information should be forwarded to each one of a plurality of endpoints (e.g., all endpoints of friends on the user's friends list).

As noted above, previous push and pull methods for social information signaling would tax a communication network by sending a large number of signaling messages across the access networks and core network. However, by using the behavior parameter, the number of messages may be reduced significantly.

In one embodiment, the behavior parameter may comprise the strength of relationship. In one embodiment, the strength of relationship may be pre-defined or automatically determined. For example, the UE 126 may pre-define the relationships with the users of the UEs 132, 134 and 136. The user of UE 132 may be a family member, the user of UE 134 may be a friend and the user of UE 136 may be a co-worker. In one embodiment, the user of the UE 126 may pre-define a family member as being the strongest relationship, a friend as being a medium strength of relationship and a co-worker as being a lowest strength of relationship.

In another embodiment, the strength of relationship may be pre-defined via a numerical value from a scale of 1 to 10, for example, with 10 being the strongest relationship and 1 being the weakest. For example, the UE 126 may assign a value of 10 to the relationship with the user of UE 132, a value of 5 to the relationship with the user of UE 134 and a value of 1 to the relationship with the user of UE 136.

In another embodiment, the strength of relationship may be automatically determined. For example, communications between the UE 126 and the UEs 132, 134 and 136 may be monitored for a pre-defined time period to track how many communications occur between two UEs, when the communications occur between two UEs, how the communications occur between two UEs, when the communications occur between two UEs, a geographic proximity between two UEs, and the like.

In some embodiments, multiple parameters may be used to automatically determine the strength of relationship to eliminate false positives. For example, if only how many communications occurred between two UEs is used, and if a user calls a customer service representative numerous times because they are unreachable, the customer service representative may be mistakenly assigned a high value for the strength of relationship. In one embodiment, such false positives can be identified by the user via a feedback mechanism and are eliminated accordingly.

Based upon the monitoring, a strength of relationship between the UE 126 and each of the UEs 132, 134 and 136 may be calculated. In one embodiment, a numerical score reflecting the strength of relationship may be assigned to each of the UEs 132, 134 and 136 based upon the monitored communications. For example, a numerical scale from 1 to 10 may be used with 10 being the highest value or strongest relationship. In another example, a scoring system may be applied using a weighted score for each of the parameters that are monitored as described above. For example, a score for how the communications occurred between two UEs may be weighted higher than the raw number of how many times communications occurred between two UEs and the values may be added together to obtain an overall score.

In one embodiment, the strength of relationship may be a dynamic parameter. In other words, after the initial strength of relationship is set, whether it is pre-defined or automatically determined, the strength of relationship may change. For example, the communications between the UE 126 and the UEs 132, 134 and 136 may be continuously monitored or tracked. For example, if the frequency of communications between the UE 126 and the UE 132 increases over time, the strength of relationship between the UE 126 and the UE 132 may be increased. In another example, if the location of the UE 134 is detected to be within the same town as the UE 126, the strength of relationship between the UE 126 and the UE 134 may be increased. In another example, if the frequency of communications between the UE 126 and the UE 136 decreases over time, the strength of relationship between the UE 126 and the UE 136 may be decreased.

In one embodiment, the behavior parameter may include other parameters such as, for example, a device usage. For example, the device usage may describe whether a friend's UE is active or inactive or how often the friend's UE is used.

In one embodiment, a criticality of the social information may also be considered when determining whether the social information should be forwarded. In one embodiment, the user may pre-define the social information as being critical (e.g., a location change greater than "x" number of miles) or not critical (e.g., a mood change). Since determining what is critical and noncritical is very subjective, one user may define one behavior parameter as critical whereas another user will define the very same behavior parameter as non-critical.

In another embodiment, the criticality of the social information may be automatically determined based upon a type of social information, key words, whether the social information has historically been considered to be critical or not critical, and the like.

In one embodiment, based upon the behavior parameter the method 200 may determine whether the social information should be forwarded. In other words, unlike previous methods that blindly transmit the social information to all of the endpoint devices associated with people listed in a user's friends list, the present disclosure may only forward the social information based upon the behavior parameter. In one embodiment, the additional parameters discussed above may also be considered such as the device usage and/or the criticality of the social information.

At step 208, the method 200 forwards the social information to the second endpoint if the behavior parameter is above a pre-defined level. As discussed above, in one embodiment, the behavior parameter may be a strength of relationship. The pre-defined level may be a pre-defined level of relationship, for example, only a highest level of relationship (e.g., a family member) or some predefined scores. As a result, if the UEs on the friends list of the UE

126 are not at the highest level of relationship, the social information associated with the UE 126 would not be forwarded to the UEs on the friends list of the UE 126 that are not at the highest level of relationship.

Other behavior parameters and the criticality of information may also be associated with a pre-defined level. For example, the behavior parameter of device usage may have a pre-defined level of "on". In other words, the endpoint must be turned "on". Otherwise, the PS 108 will not forward the social information to that UE even if the UE meets the pre-defined level of relationship. Another example of a pre-defined level for device usage may be a pre-defined number of communications with the UE 126 within a pre-defined time period. For example, the social information should only be forwarded to those UEs which have communicated with the UE 126 at least once in the past 24 hours, past week, and so on. In one embodiment, the pre-defined level for the criticality of information may be set to only forward social information that is deemed critical.

In one embodiment, one or more of these parameters and associated pre-defined levels may be used to determine if the social information should be forwarded. As a result, a significant amount of the social information signaling may be reduced in the communication network 100. For example, the PS 108 may only forward the status update from the UE 126 if a UE on the friends list of UE 126 has a highest level of relationship (e.g., a family member) with the UE 126. Thus, using the above example, the PS 108 would only forward the social information to the UE 132. Consequently, in the above example, only one signaling message would move across the access network 124 as opposed to three signaling messages in the push model and six signaling messages in the pull model.

In one embodiment, the behavior model may also be applied to signaling aggregation. For example, based upon the behavior model of the UEs the signaling aggregation may be performed via dynamic windowing as opposed to static windowing. To illustrate, if the behavior model suggests that UEs 132, 134 and 136 tend to communicate with the UE 126 most during the hours of 5:00 PM to 6:00 PM, the signaling messages may be aggregated in a window of time between 5:00 PM to 6:00 PM to wait for the social information signaling expected from the UEs 132, 134 and 136. Subsequently, the aggregation may be performed during the normal aggregation time window, e.g., 30 minutes.

At a later time, the UE 132 may send social information that is deemed to be critical. As a result, the social information may be immediately sent instead of waiting for the aggregation to be performed during the normal aggregation time window.

In another embodiment, if the behavior model determines that certain social information is not critical, the social information may be held to be aggregated with additional messages for a pre-defined period of time or until a critical social information is received. The method 200 ends at step 210.

Figure 3:
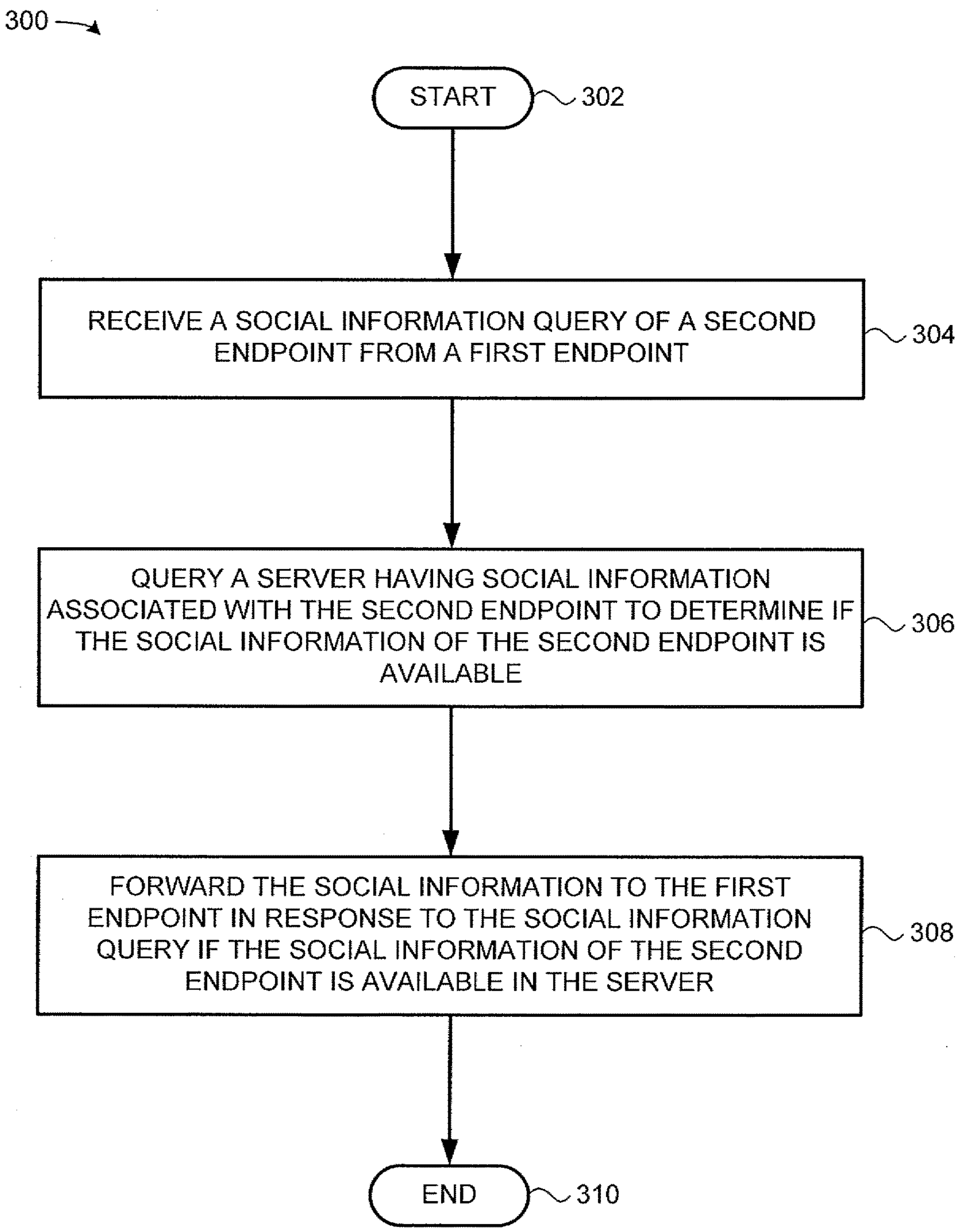
FIG. 3 illustrates an example flowchart of a second embodiment of a method for optimizing social information signaling in a communication network.

FIG. 3 illustrates an example flowchart of another embodiment of a method 300 for optimizing social information signaling in a communication network. In one embodiment, the steps, functions, or operations of the method 300 may be performed by the SBC 110, the SBC 112 in the core network 102 or a general purpose computer or computing device described in FIG. 5 and discussed below.

The method 300 begins at step 302. At step 304, the method 300 receives a social information query of a second endpoint from a first endpoint. For example, the UE 126 may send a SIP options message to request a status update from each one of the friends UEs 132, 134 and 136. The request may be intercepted by the SBC 110.

At step 306, the method 300 queries a server having social information associated with the second endpoint to determine if the social information of the second endpoint is available. In one embodiment, the server may be either a presence server or a network address book depending how the second endpoint that is being queried communicates its social information in the communication network. For example, if the second endpoint is associated with a NAB, then the SBC 110 may query the NAB associated with the second endpoint. If no NAB exists, the SBC 110 may query a presence server.

At step 308, the method 300 forwards the social information to the first endpoint in response to the social information query if the social information of the second endpoint is available in the server. For example, the UEs 132 and 134 may be associated with the NAB 116 and the NAB 118, respectively. The UEs 132 and 134 may send their status information to the NAB 116 and the NAB 118, respectively, via SynchML messages. The SBC 110 may query the NAB 116 and the NAB 118 to obtain the status of the UE 132 and the UE 134. Subsequently, the SBC 110 may forward the status information back to the UE 126 that sent the query.

Similarly, the UE 136 may not be associated with a NAB. The SBC 110 may query the PS 108 to obtain the status information of the UE 136. The status information of the UE 136 may then be forwarded back to the UE 126 via the SBC 110.

As a result, social information signaling messages are reduced. Previously, the social information query sent by the UE 126 would be sent across the access network 124 to each of the UEs 132, 134 and 136. As a result, double the social information signaling messages would be required. However, in the present embodiment, the UEs 132, 134 and 136 need only send their social information to the respective NAB 116 or 118 or the PS 108. Subsequently, the social information may then be obtained by the SBC 110 and forwarded back to the UE 126 without having to forward the original social information query from the UE 126 back across the access network 124.

It should be noted that if the PS 108 or the NABs 116 and 118 do not contain the social information, then the social information query would be processed as traditionally performed via a peer-to-peer signaling method. In other words, the social information query would be sent to the UEs 132, 134 and 136 and the UEs 132, 134 and 136 would send a response accordingly. The method 300 ends at step 310.

Figure 4:
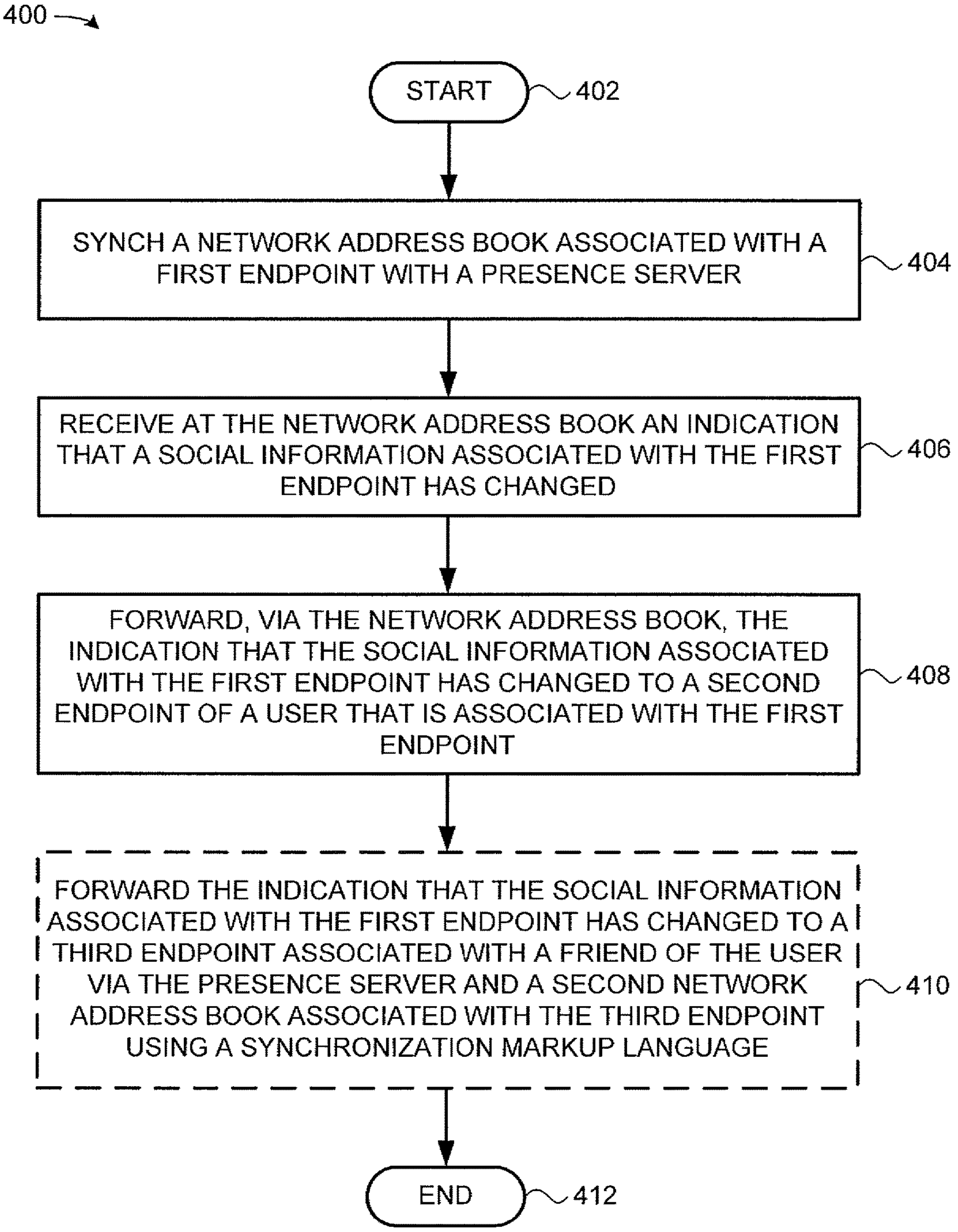
FIG. 4 illustrates an example flowchart of a third embodiment of a method for optimizing social information signaling in a communication network.

FIG. 4 illustrates an example flowchart of another embodiment of a method 400 for optimizing social information signaling in a communication network. In one embodiment, the steps, functions, or operations of the method 400 may be performed by an NAB, e.g., the NAB 114, in the core network 102 or a general purpose computer or computing device described in FIG. 5 and discussed below.

The method 400 begins at step 402. At step 404, the method 400 synchs a network address book associated with a first endpoint with a presence server. For example, the NAB 114 may synch with the PS 108 to ensure the NAB 114 has the latest social information associated with the UE 126 from the PS 108. In other words, after the synching is performed, the social information associated with the UE 126 would be identical in the NAB 114 and the PS 108.

At step 406, the method 400 receives at the network address book an indication that an aspect of the social information associated with the first endpoint has changed. For example, the status of the UE 126 may change from unavailable to available. As a result, the UE 126 may send a SynchML message to the NAB 114.

At step 408, the method 400 forwards, via the network address book, the indication that the social information associated with the first endpoint has changed to a second endpoint of a user that is associated with the first endpoint. In other words, as noted above, the UEs 126, 128 and 130 may all belong to the same user. The UE 126 may be the user's smart phone, the UE 128 may be the user's tablet computer and the UE 130 may be the user's desktop computer. If the user changes his or her status to available on the UE 126, then the same status should appear on all of the UEs of the user. Thus, the NAB 114 may forward the social information that has changed (e.g., the status change from unavailable to available) via a SynchML message to the user's other UEs 128 and 130.

Due to the fact that the NAB 114 and the PS 108 were synched in step 404, the PS 108 would not send duplicate SIP notify messages to the UEs 128 and 130 as previously done. In other words, previous methods would require both the NAB 114 and the PS 108 to send the same social information to the user's UEs 128 and 130. However, by synching the NAB 114 and the PS 108, the number of social information signaling messages that is transmitted in the communication network 100 may be cut in half.

The method 400 may perform optional step 410. In one embodiment, the method 400 may forward the indication that the social information associated with the first endpoint has changed to a third endpoint associated with a friend of the user via the presence server and a second network address book associated with the third endpoint using a synchronization markup language. For example, if the other UEs on the friends list of the UE 126 also are associated with a NAB, the NAB 114 may forward the indication that the status of the UE 126 has changed to the PS 108, which may then forward it to the appropriate NAB. For example, if the indication that the status of the UE 126 has changed is going to the UE 132, the PS 108 may forward the indication to the NAB 116, which may then forward the indication via a SynchML message to the UE 132.

The NAB 116 would be synchronized with the PS 108 similar to the synchronization between the NAB 114 and the PS 108, as described above in step 404. As a result, the PS 108 would not send additional SIP notify messages to the UE 132, thereby, again reducing the number of social information signaling messages that are sent across the communication network 100.

Notably, if the UE 132 is not associated with an NAB, then the indication would be forwarded normally via a SIP notify message from the PS 108 and step 410 would not need to be performed. The method 400 ends at step 412.

It should be noted that although not explicitly specified, one or more steps or operations of the methods 200, 300 and 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIGS. 2-4 that recite a determining operation, or involve a decision, do not necessarily require that both branches of the determining operation be practiced. In other words, one of the branches of the determining operation can be deemed as an optional step. Furthermore, operations, steps or blocks of the above described methods can be combined, separated, and/or performed in a different order from that described above, without departing from the example embodiments of the present disclosure.

FIG. 5 depicts a high-level block diagram of a general-purpose computer suitable for use in performing the functions described herein. As depicted in FIG. 5, the system 500 comprises a processor or hardware processor element 502 (e.g., a microprocessor, a central processing unit (CPU) and the like), a memory 504, e.g., random access memory (RAM) and/or read only memory (ROM), a module 505 for optimizing social information signaling in a communication network, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps, functions and/or operations of the above disclosed methods. In one embodiment, the present module or process 505 for optimizing social information signaling in a communication network can be implemented as computer-executable instructions (e.g., a software program comprising computer-executable instructions) and loaded into memory 504 and executed by hardware processor 502 to implement the functions as discussed above. Alternatively, the hardware processor 502 having executed the computer-executable instructions may cause one or more elements of system 500 to implement one or more functions as discussed above.

As such, the present method 505 for optimizing social information signaling in a communication network as discussed above in methods 200, 300 and 400 (including associated data structures) of the present disclosure can be stored on a non-transitory (e.g., tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for forwarding social information in a communication network, the method comprising:

receiving, by at least one processor deployed in the communication network, an indication that the social information associated with a first hardware endpoint device has changed, wherein the social information comprises a status of the first hardware endpoint device, wherein the status of the first hardware endpoint device comprises at least one of: online, offline, available, or unavailable;

determining, by the at least one processor, whether the social information associated with the first hardware endpoint device is to be forwarded to a second hardware endpoint device, wherein the second hardware device is included in a list corresponding to the first hardware endpoint device based upon a strength of relationship, wherein the list is stored in the communication network;

storing, by the at least one processor, the social information associated with the first hardware endpoint device, wherein the social information associated with the first hardware endpoint device is stored to be forwarded to the second hardware endpoint device during an aggregation time window when the strength of relationship is below a first pre-defined level;

receiving, by the at least one processor, an indication that the social information associated with a third hardware endpoint device has changed, wherein the indication that the social information associated with the third hardware endpoint device has changed is received prior to the aggregation time window, wherein the indication includes a criticality parameter that is used to determine whether the social information associated with the third hardware endpoint device should be forwarded prior to the aggregation time window; and forwarding, by the at least one processor, the social information associated with the first hardware endpoint device and the social information associated with the third hardware endpoint device to the second hardware endpoint device via the communication network prior to the aggregation time window when the criticality parameter is above a second pre-defined level.

2. The method of claim 1, wherein the method is performed by the at least one processor of a presence server.

3. The method of claim 1, wherein the strength of relationship is a static parameter pre-defined by a user of the first hardware endpoint device.

4. The method of claim 1, wherein the strength of relationship is a dynamic parameter.

5. The method of claim 4, wherein the strength of relationship changes based upon a frequency of communication.

6. The method of claim 4, wherein the strength of relationship changes based upon a proximity of location.

7. The method of claim 1, wherein the determining is further based upon a device usage of the second hardware endpoint device.

8. The method of claim 1, wherein the determining and the forwarding are performed for each one of a plurality of hardware endpoint devices that includes the second hardware endpoint device and the third hardware endpoint device.

9. The method of claim 1, wherein the social information is received using a session initiation protocol publish message.

10. The method of claim 1, wherein the social information is forwarded using a session initiation protocol notify message.

11. A method for forwarding social information in a communication network, the method comprising:

synching, by at least one processor of a network address book that is deployed in the communication network, the social information associated with a first hardware endpoint device, wherein the social information is stored on the network address book of a presence server, wherein the social information comprises a status of the first hardware endpoint device, wherein the status of the first hardware endpoint device comprises at least one of: online, offline, available, or unavailable;

receiving, by the at least one processor, an indication that the social information associated with the first hardware endpoint device has changed;

storing, by the at least one processor, the social information associated with the first hardware endpoint device, wherein the social information associated with the first hardware endpoint device is stored to be forwarded to a second hardware endpoint device during an aggregation time window when a strength of relationship is below a first pre-defined level;

receiving, by the at least one processor, an indication that the social information associated with a third hardware endpoint device has changed, wherein the indication that the social information associated with the third hardware endpoint device has changed is received prior to the aggregation time window, wherein the indication includes a criticality parameter that is used to determine whether the social information associated with the third hardware endpoint device should be forwarded prior to the aggregation time window; and forwarding via the communication network, by the at least one processor, the indication that the social information associated with the first hardware endpoint device has changed and the indication that the social information associated with the third hardware endpoint device has changed to the second hardware endpoint device prior to the aggregation time window when the criticality parameter is above a second pre-defined level.

12. The method of claim 11, wherein the forwarding is performed using a synchronization markup language message.

13. The method of claim 11, further comprising:

forwarding the indication that the social information associated with the first hardware endpoint device has changed and the indication that the social information associated with the third hardware endpoint device has changed to a fourth hardware endpoint device via the presence server and a second network address book associated with the fourth hardware endpoint device using a synchronization markup language.

* * * * *